United States Patent
Kim et al.

(10) Patent No.: US 11,880,046 B2
(45) Date of Patent: Jan. 23, 2024

(54) AUTOMATIC POLARIZATION CONTROL DEVICE AND METHOD

(71) Applicants: SAI TECHNOLOGIES CORP., Daejeon (KR); Jun Sik Kim, Daejeon (KR)

(72) Inventors: Jun Sik Kim, Daejeon (KR); Seung Seo Park, Daejeon (KR)

(73) Assignees: SAI TECHNOLOGIES CORP., Daejeon (KR); Jun Sik Kim, Daejeon (KR)

(*) Notice: Subject to any disclaimer, the term of this patent is extended or adjusted under 35 U.S.C. 154(b) by 570 days.

(21) Appl. No.: 17/059,737

(22) PCT Filed: Jun. 13, 2019

(86) PCT No.: PCT/KR2019/007134
§ 371 (c)(1),
(2) Date: Nov. 30, 2020

(87) PCT Pub. No.: WO2020/004837
PCT Pub. Date: Jan. 2, 2020

(65) Prior Publication Data
US 2021/0215944 A1     Jul. 15, 2021

(30) Foreign Application Priority Data

Jun. 25, 2018 (KR) .................. 10-2018-0072491

(51) Int. Cl.
| G02B 27/28 | (2006.01) |
| G02B 5/30 | (2006.01) |
| H04N 23/54 | (2023.01) |
| H04N 23/55 | (2023.01) |

(52) U.S. Cl.
CPC ......... *G02B 27/286* (2013.01); *G02B 5/3016* (2013.01); *G02B 27/288* (2013.01); *H04N 23/54* (2023.01); *H04N 23/55* (2023.01)

(58) Field of Classification Search
CPC .. G02B 27/286; G02B 27/288; G02B 5/3016; G02F 1/13; G02F 1/1335; G02F 1/3363; H04N 23/54; H04N 23/55
USPC ....... 359/253, 259, 490.01, 492.01; 349/101, 349/179, 181; 348/751, 752
See application file for complete search history.

(56) References Cited

U.S. PATENT DOCUMENTS

| 5,642,214 A * | 6/1997 | Ishii ................. G02F 1/13473 349/96 |
| 7,933,509 B2 * | 4/2011 | Yang ................. G03B 5/00 348/208.99 |
| 9,057,896 B1 | 6/2015 | Baldwin |

(Continued)

FOREIGN PATENT DOCUMENTS

| JP | 2000-266931 A | 9/2000 |
| JP | 2005-173493 A | 6/2005 |

(Continued)

*Primary Examiner* — Ricky D Shafer
(74) *Attorney, Agent, or Firm* — Birch, Stewart, Kolasch & Birch, LLP

(57) ABSTRACT

An automatic polarization control device and a method thereof are proposed. More particularly, the automatic polarization control device and the method thereof is provided to control a penetrated polarization direction of light incident on a camera by using electricity and generate a polarization image desired by a user.

10 Claims, 10 Drawing Sheets

(56) References Cited

U.S. PATENT DOCUMENTS

| | | | |
|---|---|---|---|
| 2007/0195227 A1* | 8/2007 | Dufresne | G02F 1/1337 349/96 |
| 2014/0055664 A1 | 2/2014 | Yamagata et al. | |
| 2015/0141753 A1 | 5/2015 | Kanamori | |
| 2016/0282639 A1* | 9/2016 | von und zu Liechtenstein | G01J 4/00 |

FOREIGN PATENT DOCUMENTS

| | | |
|---|---|---|
| JP | 2008-96461 A | 4/2008 |
| JP | 2017-173685 A | 9/2017 |
| JP | 2017-228983 A | 12/2017 |
| KR | 10-1165695 B1 | 7/2012 |
| KR | 10-2016-0069029 A | 6/2016 |
| KR | 10-2018-0013477 A | 2/2018 |
| WO | WO 2014/125529 A1 | 8/2014 |

\* cited by examiner

AUTOMATIC POLARIZATION CONTROL DEVICE AND METHOD

CROSS REFERENCE TO RELATED APPLICATIONS

This application is the National Phase of PCT/KR2019/007134 filed on Jun. 13, 2019, which claims priority under 35 U.S.C. § 119(a) to Patent Application No. 10-2018-0072491 filed in the Republic of Korea on Jun. 25, 2018, all of which are hereby expressly incorporated by reference into the present application.

TECHNICAL FIELD

The present disclosure relates to an automatic polarization control device and a method thereof and, more particularly, to an automatic polarization control device and a method thereof, wherein a penetrated polarization direction of light incident on a camera is electrically controlled to generate a polarization image desired by a user.

BACKGROUND ART

When performing image processing for a photograph or a video by using a camera such as a DSLR digital camera or a smartphone camera, there is a case where a polarizing filter is installed on the camera and the image processing is performed. After installing such a polarizing filter and performing the image processing for a photograph, a clear photograph or video may be obtained by eliminating strongly polarized reflections, which is usually called diffuse reflection. An image that is image-processed through the polarizing filter preserves a natural color almost as it is may be obtained, unlike an image that does not use the polarizing filter.

In the case of conventional image processing using a polarizing filter, while rotating the polarizing filter after placing the polarizing filter in front of a camera, the polarizing filter is fixed in accordance with a desired penetrated polarization direction, and the image processing is performed.

However, the conventional polarizing filter has an inconvenient aspect in terms of use because the penetrated polarization direction is manually controlled.

In order to solve these problems, a technique was developed wherein a rotation mechanism part is coupled to a passive polarizing filter and the rotation mechanism part is driven by a motor to rotate the polarizing filter, whereby image processing is performed with a camera while changing a penetrated polarization direction. However, although this technique is simple, a mechanical transfer structure is still used, and accordingly, when automatic polarization conversion is operated at high speed or frequent detachment is required, there is a problem in that durability problems may occur, noise is generated during operation, much power consumption occurs, and frequent breakdowns occur due to the complex mechanical structure.

In Korean Patent No. 10-1165695, an "AUTOMATIC CONTROLLABLE POLARIZED LIGHT FILTER FOR DETECTING ROAD SURFACE CONDITION, AND DRIVING METHOD FOR THE SAME" is disclosed.

DISCLOSURE

Technical Problem

Therefore, the present disclosure has been devised to solve the above-described problems, and an objective of the present disclosure is to provide an automatic polarization control device and a method thereof, wherein a penetrated polarization direction of light incident on a camera is electrically controlled to generate a polarization image desired by a user.

The objective of an exemplary embodiment of the present disclosure is not limited to the above-mentioned objective, and other different objectives not mentioned herein will be clearly understood by those skilled in the art from the following description.

Technical Solution

An automatic polarization control device according to an exemplary embodiment of the present disclosure for achieving the above objective includes: a first liquid crystal (100) for polarizing a penetrated polarization component according to an applied voltage; a polarization controller 150 for controlling a voltage applied to the first liquid crystal 100; a first polarizing filter 200 provided at a rear of the first liquid crystal 100 so as to fix a penetrated polarization direction and penetrating incident light polarized in the penetrated polarization direction; an image sensor 600 provided at a rear of the first polarizing filter 200 and imaging the penetrated light passing through the first liquid crystal 100 and the first polarizing filter 200; a processor 700 performing image processing for the penetrated light imaged by the image sensor 600; and an image storage 800 for storing an image that is image-processed by the processor 700.

In addition, the first polarizing filter 200 may include a plurality of regions where the penetrated polarization direction is fixed for each region, and there may be at least two types of the penetrated polarization direction.

In addition, the automatic polarization control device may further include: a second liquid crystal 300 provided between the first polarizing filter 200 and the image sensor 600 and polarizing the penetrated polarization component according to the applied voltage; and a second polarizing filter 400 provided between the second liquid crystal 300 and the image sensor 600 so as to fix the penetrated polarization direction and penetrating the incident light polarized in the penetrated polarization direction.

In addition, the automatic polarization control device may further include: an image design part 900 for designing an image processing sequence so as to acquire an optimal polarization image according to a purpose of use for the image processing and controlling the polarization controller 150 and the processor 700 according to the designed image processing sequence.

In addition, the automatic polarization control device may further include: an image determination part 950 for comparing polarization images of various angles according to a design of the image design part 900 to select the polarization images suitable for the purpose of use for the image processing, or generating an image suitable for the purpose of the image processing based on the polarization images of various angles.

In addition, the image determination part 950 may generate an image by using any one calculation selected from among maximum pixel value calculation, minimum pixel value calculation, image calculation of an absolute value of a polarization difference, and polarization difference image calculation for each color, the calculation being based on a plurality of polarization images.

In an automatic polarization control method according to an exemplary embodiment of the present disclosure, the automatic polarization control method using an automatic polarization control device, the device including: a first liquid crystal 100 for polarizing a penetrated polarization component according to an applied voltage; a polarization controller 150 for controlling a voltage applied to the first liquid crystal 100; a first polarizing filter 200 provided at a rear of the first liquid crystal 100 so as to fix a penetrated polarization direction is fixed and penetrating incident light polarized in the penetrated polarization direction; an image sensor 600 provided at a rear of the first polarizing filter 200 and imaging the penetrated light passing through the first liquid crystal 100 and the first polarizing filter 200; a processor 700 performing image processing for the penetrated light imaged by the image sensor 600; an image storage 800 for storing an image that is image-processed by the processor 700; an image design part 900 for designing an image processing sequence so as to acquire an optimal polarization image according to a purpose of use for the image processing and controlling the polarization controller 150 and the processor 700 according to the designed image processing sequence; and an image determination part 950 for comparing polarization images of various angles according to a design of the image design part 900 to select the polarization images suitable for a situation ahead or the purpose of use for the image processing, or generating an image suitable for the situation ahead or the purpose of the image processing based on the polarization images of various angles, the method includes: designing an optimal polarization image S10 for acquiring the optimal polarization image according to the purpose of use by the image design part 900, processing an image S20 in which the processor 700 controls the polarization controller 150 according to a design of the designing of the optimal polarization image S10 to perform the image processing for a required image; and acquiring an optimal image S30 for comparing the polarization images of various angles according to the design of the image design part 900 to select the polarization images suitable for the situation ahead or the purpose of use for the image processing, or generating an image suitable for the purpose of use based on the polarization images of various angles.

In addition, the acquiring of the optimal image S30 may apply relative contributions based on the polarization images of various angles to generate the image suitable for the purpose of use.

In addition, the relative contributions (a and b) may be calculated by making polarized light having a polarization conversion angle of β angle incident, applying a voltage V to the first liquid crystal 100, putting the polarizing filter in a state of penetrating vertically polarized light, measuring light intensity La^ with a light sensor, putting the polarizing filter in a state of penetrating horizontally polarized light, measuring light intensity Lb^ with the light sensor, and then in equations below, $a = La\hat{}/(La\hat{}+Lb\hat{})$ $b = Lb\hat{}/(La\hat{}+Lb\hat{})$ (where, a and b are the relative contributions),
by combining the above equations.

In addition, the relative contributions (a and b) may be calculated by making horizontally polarized light incident, applying a voltage Vβ to the first liquid crystal 100, rotating the polarizing filter at the angle where light intensity of a light sensor is the maximum, measuring an angle from the horizontal to an angle at which the light intensity is the maximum to store as a β angle, measuring the light intensity of the light sensor at the angle where the light intensity is the maximum to store as La^, rotating the polarizing filter in a state perpendicular to the angle where the light intensity is the maximum to measure the light intensity of the light sensor and store as Lb^, putting the polarizing filter in a state in which the horizontally polarized light is penetrated, measuring light intensity Lb^ in the light sensor, and then in equations below, $a = La\hat{}/(La\hat{}+Lb\hat{})$ $b = Lb\hat{}/(La\hat{}+Lb\hat{})$ (where a and b are the relative contributions),
by combining the above equations.

In addition, the automatic polarization control device may include: a second liquid crystal 300 provided between the first polarizing filter 200 and the image sensor 600 and polarizing the penetrated polarization component according to the applied voltage; and a second polarizing filter 400 provided between the second liquid crystal 300 and the image sensor 600 so that the penetrated polarization direction is fixed and the incident light polarized in the penetrated polarization direction is penetrated, wherein the first polarizing filter 200 may be provided with a plurality of regions where the penetrated polarization direction is fixed for each region, and the processing of the image S20 of the automatic polarization control method may include: applying a voltage S21 applying a voltage Vβ corresponding to the polarization angle β angle to the first liquid crystal 100; and processing a sequential image S22 for the penetrated light imaged by the image sensor 600 while sequentially changing and applying a voltage to the second liquid crystal 300 so as to pass only one penetrated light sequentially through the second polarization filter 400 among the penetrated light penetrated through the second liquid crystal 300 in the penetrated polarization direction for each region of the first polarizing filter 200, and the acquiring of the optimal image S30 of the automatic polarization control method may calculate L1(β) and L2(β+90 degrees) by combining $L1\# = a(\beta)*L1(\beta) + b(\beta+90 \text{ degrees})*L2(\beta)+90 \text{ degrees})$ $L2\# = a(\beta+90 \text{ degrees})*L2(\beta+90 \text{ degrees}) + b(\beta)*L1(\beta)$ (Where L1# is a pixel light intensity value of the penetrated light L1^ in the image sensor 600, L2# is a pixel light intensity value of the penetrated light L2^ in the image sensor 600, L1, L2, L1^, and L2^ are light intensity of each polarization component, and a, b are the relative contributions)

based on the image obtained in the processing of the sequential image S22 of performing sequential image processing, and generate an image suitable for the purpose of use by using this calculation.

In addition, the acquiring of the optimal image S30 may generate the image suitable for the purpose of use by using any one calculation selected from among maximum pixel value calculation, minimum pixel value calculation, image calculation for an absolute value of a polarization difference, and polarization difference image calculation for each color, the calculation being based on a plurality of polarization images, wherein difference calculation of the image calculation of an absolute value of a difference (i.e., the image calculation for the absolute value of the polarization difference, and the polarization difference image calculation for each color) may include division calculation and log difference calculation.

Advantageous Effects

According to an automatic polarization control device and a method thereof in accordance with an exemplary embodiment of the present disclosure, by polarizing (i.e., controlling) a polarization component of light incident on a camera (i.e., penetrated polarization direction) by electrical control in order to obtain a clear image or an image suitable for an application, there is an effect in that low-noise and high-speed polarization conversion is possible and mechanical breakdowns may be minimized at the same time.

In addition, by using a first polarizing filter in which at least two types of penetrated polarization directions are fixed for each region, there is an effect in that mechanical transfer (i.e., rotation) of a polarizing filter is not required even when four or more types of polarization images are acquired.

In addition, by further providing a second liquid crystal and a second polarizing filter, there is an effect in that the mechanical transfer (i.e., rotation) of the polarizing filter is not required even when more various types of polarization images are acquired.

In addition, by further providing an image design part, there is an effect in that an optimal polarization image may be automatically acquired and utilized according to a purpose of use for image processing, when identification of moving objects is important, when a much clearer image is to be acquired through defogging in fog, when distinguishing between road characteristics, snow, or ice on a road is required, when an inspection of defects through an image is needed, etc.

In addition, by using the maximum pixel value calculation through an image determination part, there is an effect in that an image that emphasizes reflection of an object may be obtained.

In addition, by using the minimum pixel value calculation and minimizing the reflection of the object through the image determination part, there is an effect in that a much clearer image with better color sense may be obtained.

In addition, by using an image calculation for an absolute value of a polarization difference through the image determination part, there is an effect in that an image easy to identify a moving object and to detect a vehicle ahead and a lane on a road in fog may be obtained.

In addition, by using the image calculation for the polarization difference for each color through the image determination part, there is an effect in that an image enabling easy identification of objects may be obtained.

DESCRIPTION OF THE REFERENCE NUMERALS IN THE DRAWINGS

Figure 1:
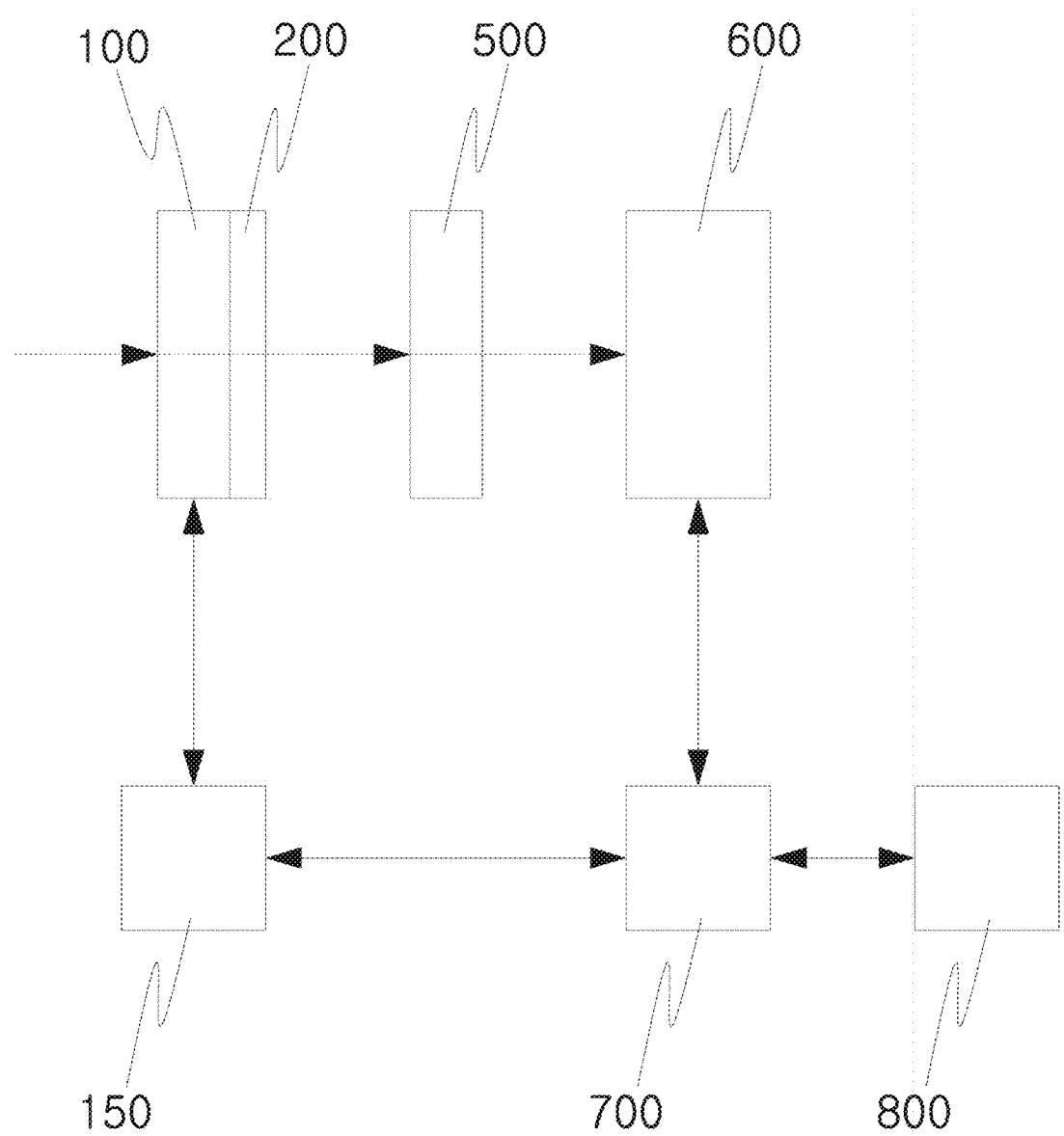
FIG. 1 is a conceptual diagram of an automatic polarization control device according to an exemplary embodiment of the present disclosure.

100: first liquid crystal
150: polarization controller
200: first polarizing filter
300: second liquid crystal
400: second polarizing filter
500: lens
600: image sensor
700: processor
800: image storage
900: image design part
950: image determination part
S10: designing optimal polarization image
S20: processing image
S21: applying voltage, S22: processing sequential image
S30: acquiring optimal image

BEST MODE

In the present disclosure, various modifications may be made and various exemplary embodiments may be provided, and specific exemplary embodiments will be illustrated in the drawings and described in detail. However, this is not intended to limit the present disclosure to a particular disclosed form. On the contrary, the present disclosure is to be understood to include all various alternatives, equivalents, and substitutes that may be included within the spirit and technical scope of the present disclosure.

When a component is described as being "connected", "coupled", or "linked" to another component, that component may be directly connected, coupled, or linked to that other component. However, it should be understood that yet another component between each of the components may be present.

In contrast, when a component is described as being "directly connected", "directly coupled", or "directly linked" to another component, it should be understood that there are no intervening components present therebetween.

The terminology used herein is for the purpose of describing particular exemplary embodiments only and is not intended to be limiting of the present disclosure. As used herein, the singular forms are intended to include the plural forms as well, unless the context clearly indicates otherwise.

It will be further understood that the terms "comprise", "include", "have", etc. when used in the present disclosure, specify the presence of features, integers, processes, operations, elements, components, and/or combinations of them stated in the specification, but do not preclude the possibility of the presence or addition of one or more other features, integers, processes, operations, elements, components, and/or combinations thereof.

Unless otherwise defined, all terms including technical and scientific terms used herein have the same meaning as commonly understood by one of those skilled in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present disclosure will be described in more detail with reference to the accompanying drawings. Prior to this, the terms or words used in the present disclosure and claims are not to be construed as being limited to their ordinary or dictionary meanings, and should be interpreted as meanings and concepts corresponding to the technical spirit of the present disclosure based on the principle that inventors may properly define the concept of a term in order to best describe their disclosure. In addition, unless otherwise defined, technical terms and scientific terms used herein have the meanings commonly understood by those skilled in the art to which this disclosure belongs, and in the following description and accompanying drawings, a description of known functions and configurations that may unnecessarily obscure the subject matter of the present disclosure will be omitted. The drawings introduced below are provided as examples in order to sufficiently convey the spirit of the present disclosure to those skilled in the art. Accordingly, the present disclosure is not limited to the drawings presented below and may be embodied in other forms. In addition, the same reference numbers throughout the specification indicate the same elements. It should be noted that the same elements in the drawings are indicated by the same reference numerals wherever possible.

Figure 2:
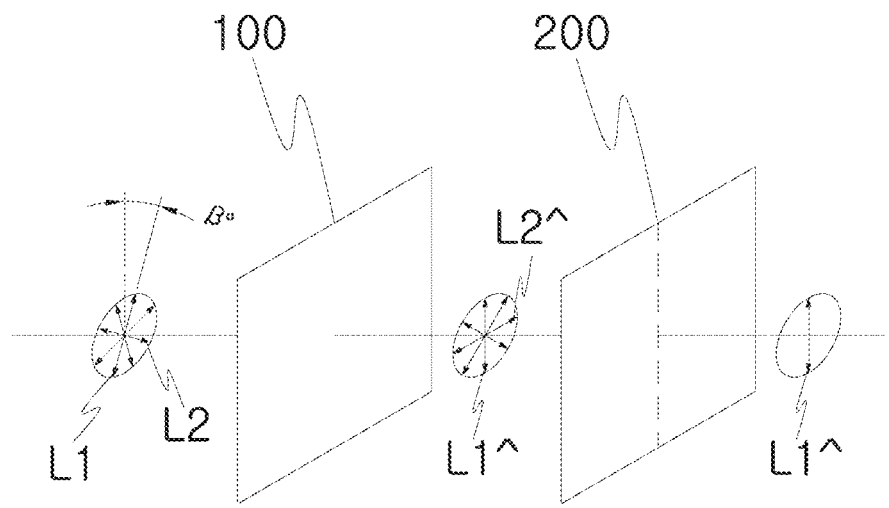
FIG. 2 is a conceptual diagram showing an example of polarization conversion of light penetrated through a first liquid crystal and a first polarizing filter of FIG. 1.
Figure 3:
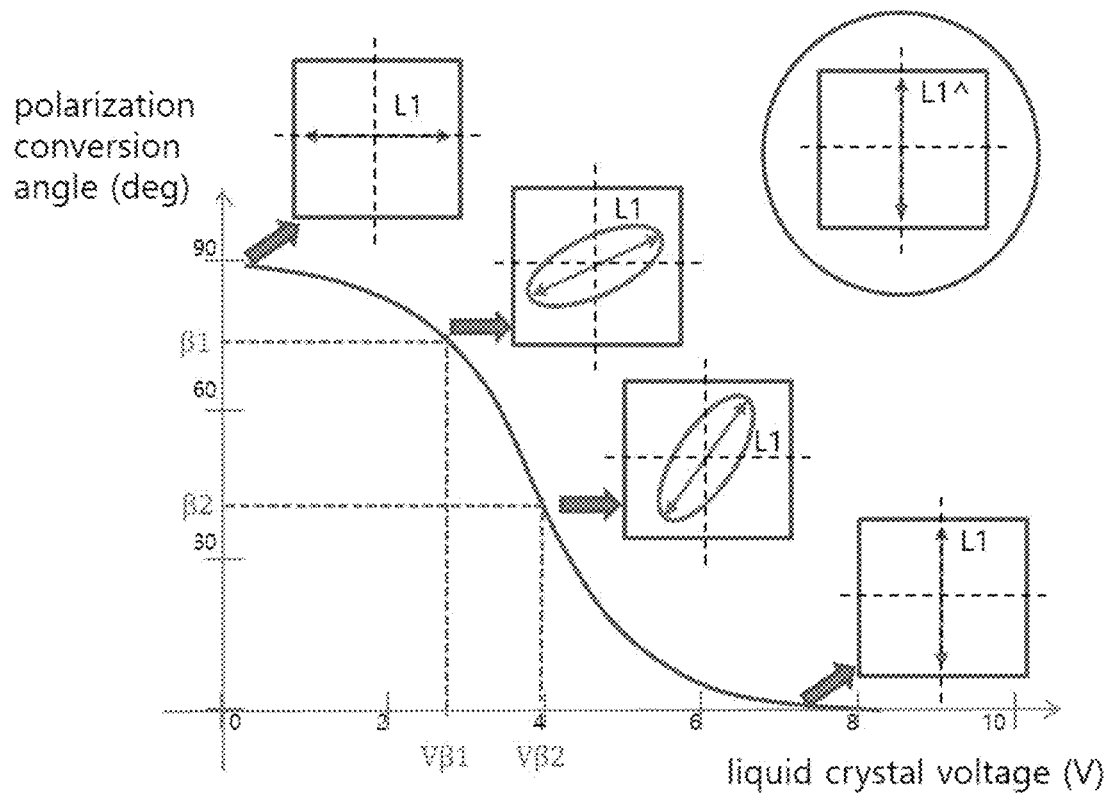
FIG. 3 is a graph showing a relationship between a liquid crystal voltage Vβ and a polarization conversion angle β of a TN liquid crystal.
Figure 4A:
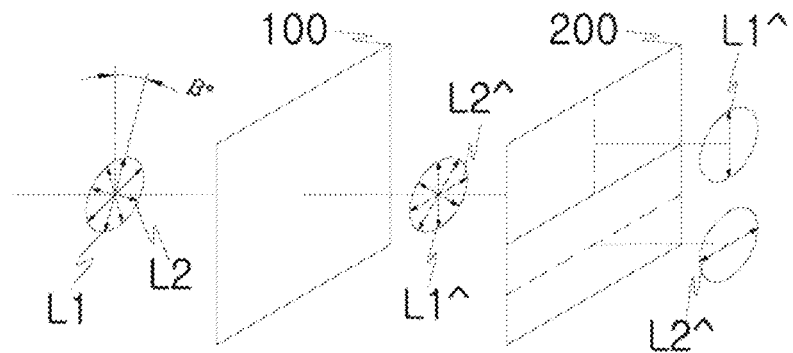
FIGS. 4A to 4C are conceptual diagrams showing examples in which the first polarizing filter of FIG. 2 is divided into regions in penetrated polarization directions different from each other.
Figure 4B:
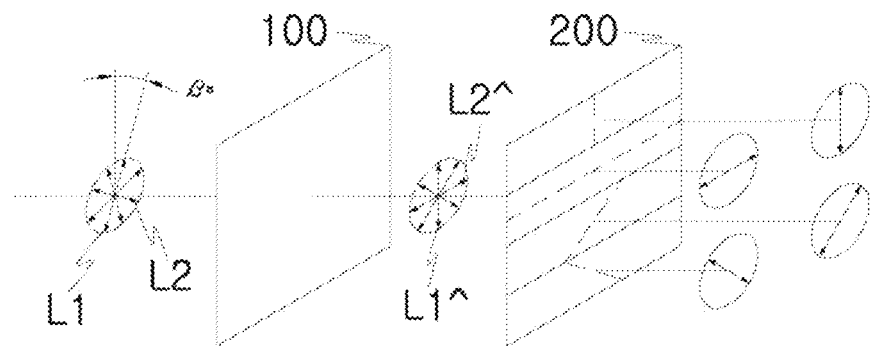
Figure 4C:
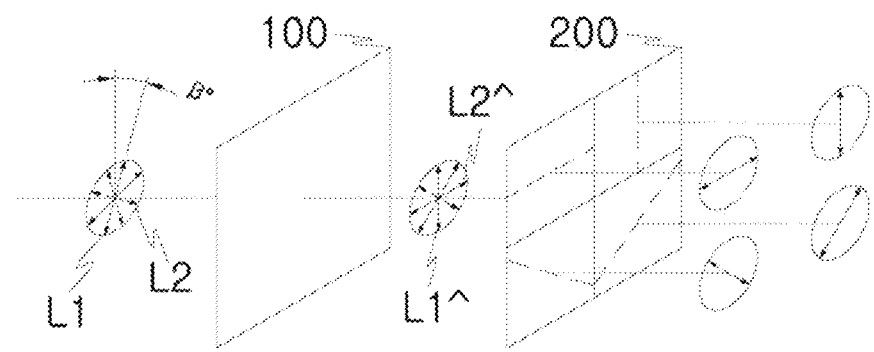
Figure 5A:
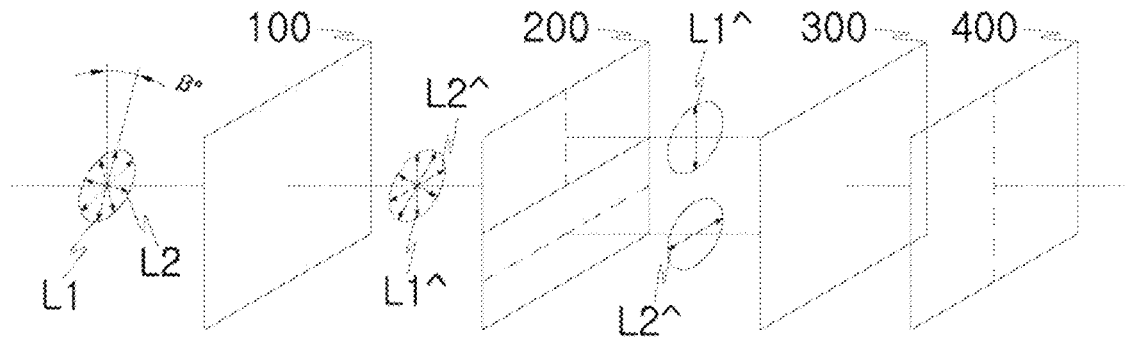
FIGS. 5A to 5C are conceptual diagrams showing examples in which a second liquid crystal and a second polarizing filter are provided between the first polarizing filter and an image sensor.
Figure 5B:
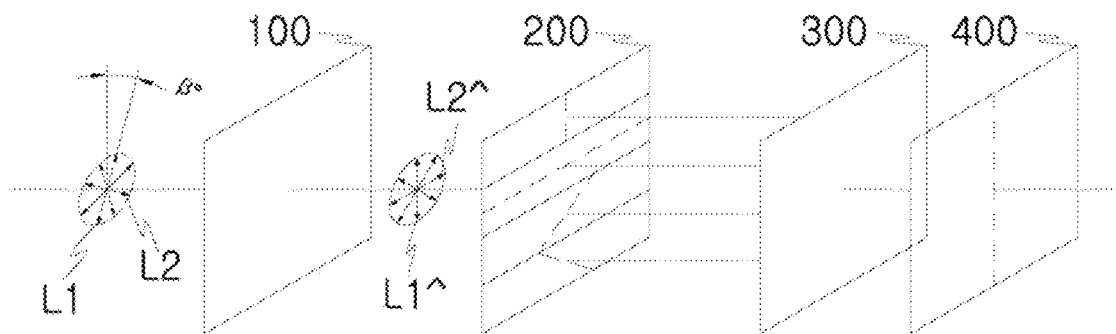
Figure 5C:
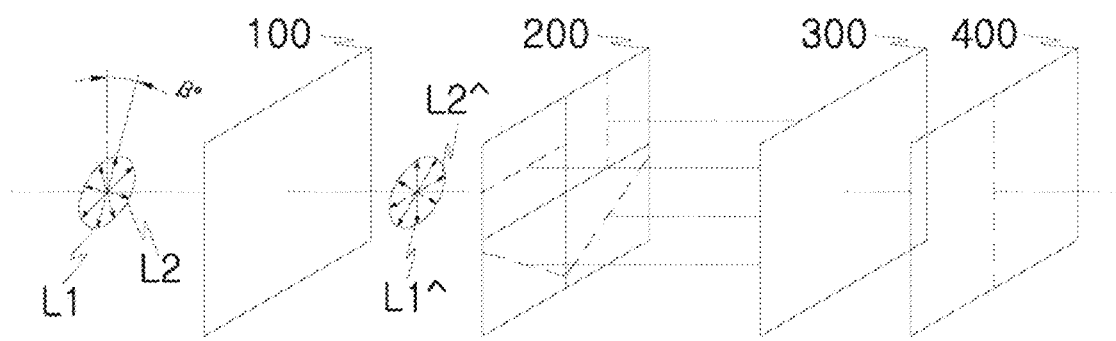
Figure 6:
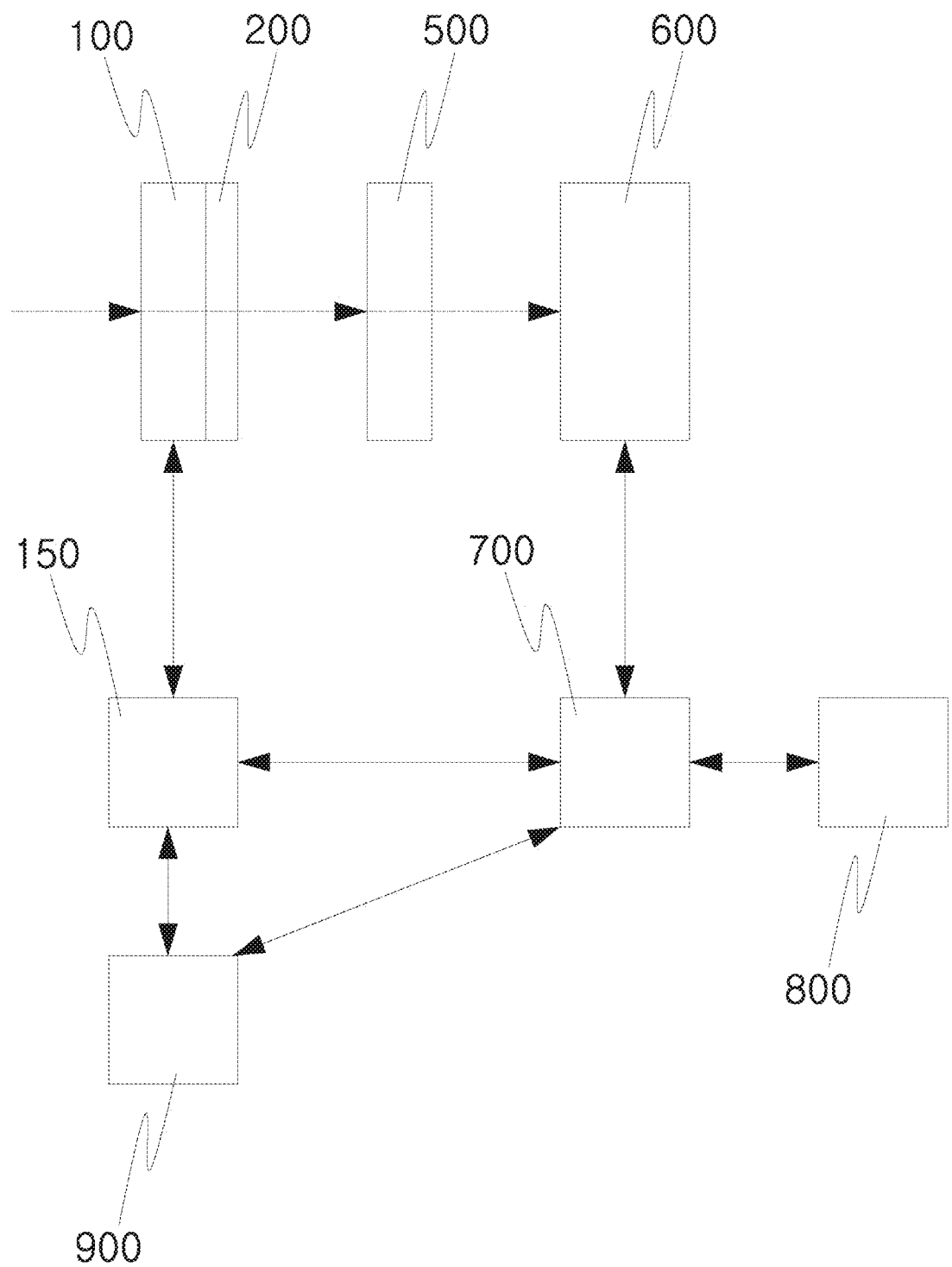
FIG. 6 is a conceptual diagram showing an example in which an image design part is added to FIG. 1.
Figure 7:
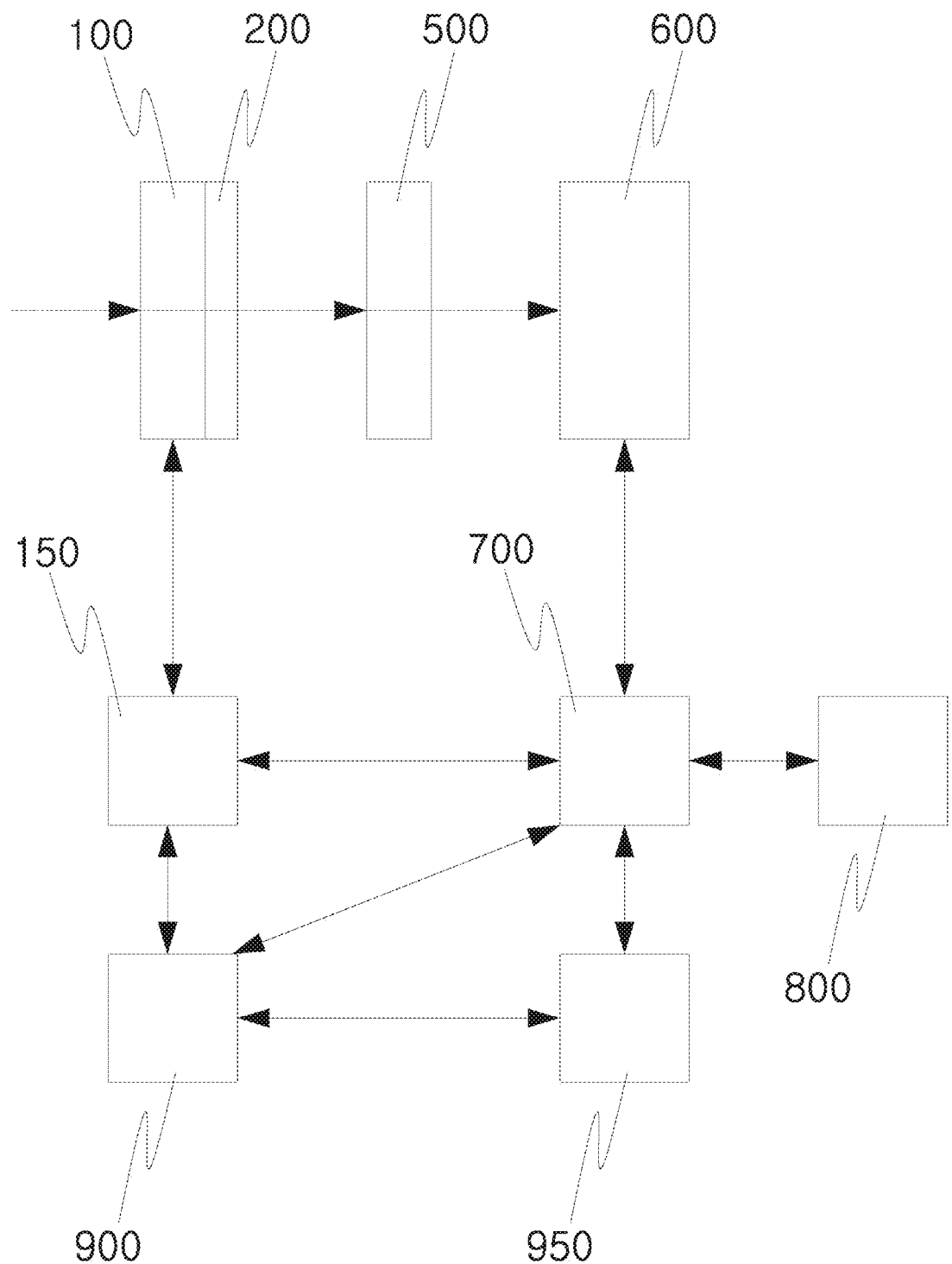
FIG. 7 is a conceptual diagram showing an example in which an image determination part is added to FIG. 6.
Figure 8:
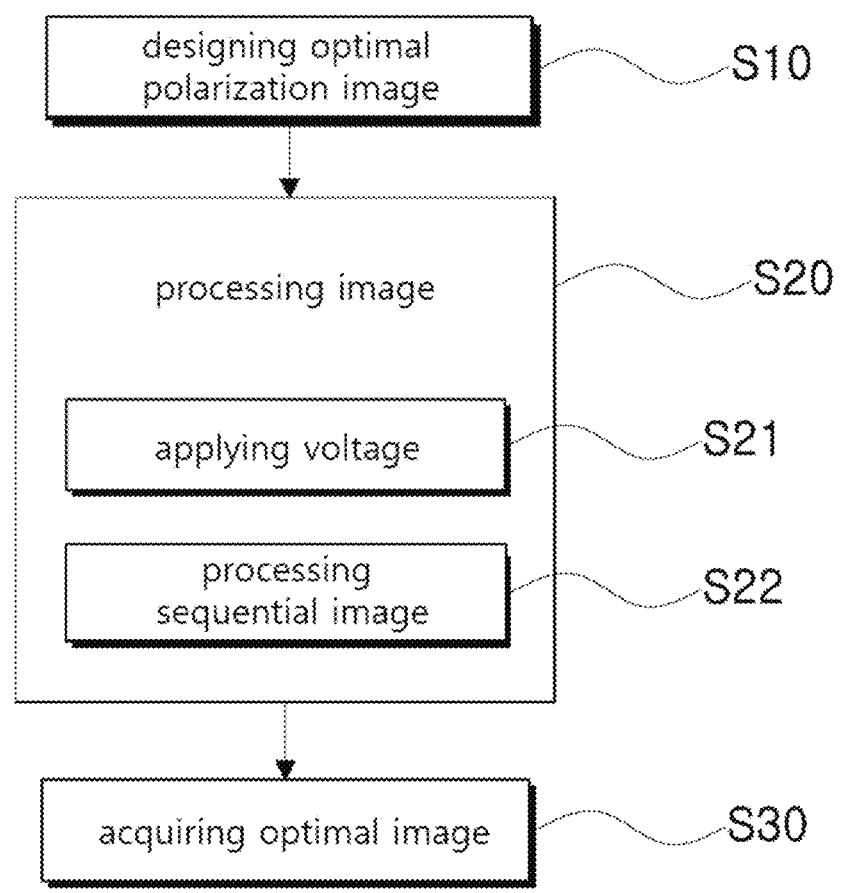
FIG. 8 is a flowchart of an automatic polarization control method according to the exemplary embodiment of the present disclosure.
Figure 9:
FIG. 9 is a polarization image in which an angle formed with respect to the earth's surface is 0 degrees.
Figure 10:
FIG. 10 is a polarization image in which an angle formed with respect to the earth's surface is 90 degrees.
Figure 11:
FIG. 11 is an image in which only a maximum image value is stored for each pixel among each polarization image.
Figure 12:
FIG. 12 is an image in which only a minimum image value is stored for each pixel of each polarization image.
Figure 13:
FIG. 13 is an image in which an image calculation for an absolute value of a polarization difference is performed.
Figure 14:
FIG. 14 is an image in which an image calculation for the polarization difference is separately performed for each color.

FIG. 1 is a conceptual diagram of an automatic polarization control device according to an exemplary embodiment of the present disclosure. FIG. 2 is a conceptual diagram showing an example of polarization conversion of light penetrated through a first liquid crystal and a first polarizing filter of FIG. 1. FIG. 3 is a graph showing a relationship between a liquid crystal voltage Vβ and a polarization conversion angle β of a TN liquid crystal. FIGS. 4A to 4C are conceptual diagrams showing examples in which the first polarizing filter of FIG. 2 is divided into regions in penetrated polarization directions different from each other. FIGS. 5A to 5C are conceptual diagrams showing examples in which a second liquid crystal and a second polarizing filter are provided between the first polarizing filter and an image sensor. FIG. 6 is a conceptual diagram showing an example in which an image design part is added to FIG. 1. FIG. 7 is a conceptual diagram showing an example in which an image determination part is added to FIG. 6. FIG. 8 is a flowchart of an automatic polarization control method according to the exemplary embodiment of the present disclosure. FIG. 9 is a polarization image in which an angle formed with respect to the earth's surface is 0 degrees. FIG. 10 is a polarization image in which an angle formed with respect to the earth's surface is 90 degrees. FIG. 11 is an image in which only a maximum image value is stored for each pixel among each polarization image. FIG. 12 is an image in which only a minimum image value is stored for each pixel of each polarization image. FIG. 13 is an image in which an image calculation for an absolute value of a polarization difference is performed. FIG. 14 is an image in which an image calculation for the polarization difference is separately performed for each color.

As shown in FIG. 1, the automatic polarization control device according to the exemplary embodiment of the present disclosure includes: a first liquid crystal 100, a polarization controller 150, a first polarizing filter 200, an image sensor 600, a processor 700, and an image storage 800.

At this time, a lens 500 may be further included between the first liquid crystal 100 and the image sensor 600.

The lens 500 is for collecting light to the image sensor 600, wherein the lens may be used by combining a plurality of convex lenses and concave lenses to reduce aberrations (i.e., spherical aberration, chromatic aberration, and the like).

A liquid crystal control UI (user interface) and a display part may be added to this configuration.

The liquid crystal control UI (user interface) may set a polarization angle in the form of an adjustment bar or directly input the polarization angle, so that only incident light having transmission polarization at the set polarization angle may be image-processed.

In addition, the liquid crystal control UI (user interface) may allow input of various polarization direction angles (e.g., 0 degrees, 45 degrees, and 90 degrees) and input of a repetitive image processing command (i.e., 'R' button), so as to be able to store images by repeatedly performing image processing with the various polarization direction angles (e.g., 0 degrees, 45 degrees, and 90 degrees) as well.

In addition, the liquid crystal control UI (user interface) enables a user to input a purpose of use, so that the user also stores the images that are image-processed with predetermined settings according to the purpose of use, when identification of moving objects is important, when a much clearer image is to be acquired through defogging in fog, when distinguishing between road characteristics, snow, or ice on a road is required, when an inspection of defects through an image is needed, etc.

The first liquid crystal 100 polarizes the penetrated polarization component according to an applied voltage.

Here, polarization conversion refers to a rotation of the polarization component at a predetermined angle, but is referred to as the polarization conversion because the penetrated light is not fully rotated at the predetermined angle to the extent of 100%.

In addition to a TN liquid crystal, the first liquid crystal 100 may use other liquid crystals such as Super Twisted Nematic (STN), Vertical Alignment (VA), and In-Plane Switching (IPS). In the present disclosure, the TN liquid crystal is mainly described for convenience of explanation.

In the present disclosure, a liquid crystal alignment axis of a light incoming surface of a liquid crystal is referred to as an anterior alignment axis, and an alignment axis of a light outgoing surface of the liquid crystal is referred to as a posterior alignment axis.

When no voltage is applied to the TN liquid crystal, linearly polarized light in the direction of the anterior alignment axis among incident light passes through the liquid crystal and is converted into the linearly polarized light in the direction of the posterior alignment axis on a light outgoing surface. Among the incident light, linearly polarized light perpendicular to the direction of the anterior alignment axis is mostly converted into linearly polarized light perpendicular to the direction of the posterior alignment axis on the light outgoing surface of the liquid crystal. Among the incident light, 90-degree polarization conversion of the linearly polarized light perpendicular to the direction of the anterior alignment axis is less pure than the linearly polarized light in the direction of the anterior alignment axis, but is mostly converted into the polarization of 90 degrees.

When a voltage is applied to a TN liquid crystal and is increased to an allowed maximum voltage, the TN liquid crystal is aligned, and the incident polarized light passes through the liquid crystal and maintains the same polarized light on the light outgoing surface.

When a voltage is applied to the TN liquid crystal at a medium voltage between 0V and the maximum voltage, a large portion of the incident light undergoes polarization conversion at a predetermined angle between 0 and 90 degrees depending on the voltage. Here, the purity of polarization conversion is lower than that of the polarization conversion at 0V.

The polarization controller 150 controls the voltage applied to the first liquid crystal 100.

The polarization controller 150 controls to apply a predetermined voltage to the first liquid crystal 100 according to a predetermined penetrated polarization direction.

The first polarizing filter 200 is provided at the rear of the first liquid crystal 100 so that the penetrated polarization direction is fixed, and transmits the incident light polarized in the penetrated polarization direction.

The first polarizing filter 200 passes a component parallel to the penetrated polarization direction (i.e., polarization axis), and is applicable in the form of a film as well.

The image sensor 600 is provided at the rear of the first polarizing filter 200, and the penetrated light passing through the first liquid crystal 100 and the first polarizing filter 200 is imaged therein.

That is, as shown in FIG. 2, when incident light is incident to the first liquid crystal 100, a polarization component rotates β degrees and is emitted from the first liquid crystal 100 according to the voltage applied to the first liquid crystal 100, and as emitted light passes through the first polarizing filter 200, only a component corresponding to the penetrated polarization direction of the first polarizing filter 200 is emitted, so that the emitted light is imaged by the image sensor 600.

At this time, a user may set camera use or a penetrated polarization direction (i.e., angle) by using an UI (user interface), and when the polarization controller 150 applies a voltage to the first liquid crystal 100 according to the penetrated polarization direction based on information input by the user through the UI (user interface), a predetermined polarized light among the incident light is mainly penetrated, thereby being imaged by the image sensor 600. In this way, the penetrated polarization direction of incident light may be electrically controlled.

In addition, the polarization controller 150 may automatically adjust the penetrated polarization direction of incident light by controlling a voltage applied to the liquid crystal in a predetermined pattern.

The processor 700 performs image processing for the penetrated light imaged by the image sensor 600.

In addition to this, the processor 700 may be used to control other components.

The image storage 800 stores an image that is image-processed by the processor 700.

The first liquid crystal 100 and the first polarizing filter 200 may be installed in front of a smartphone camera in mechanically various forms. Power may be supplied to the first liquid crystal 100 through a smartphone, or a separate power source and a polarization controller 150 may be provided outside the smartphone. In addition, it is possible to run an application for controlling liquid crystal in the smartphone by wired connection with the smartphone via USB, earphone jack, or the like.

The automatic polarization control device according to the exemplary embodiment of the present disclosure will be described in more detail on an assumption that a voltage at which polarization rotation of β angle occurs is Vβ.

As shown in FIG. 2, when a penetrated polarization direction of the first polarizing filter 200 is fixed in a vertical direction and a voltage is applied to a TN liquid crystal with a medium voltage Vβ between 0V and the maximum voltage, a large portion of incident light undergoes polarization conversion at a predetermined β angle between 0 and 90 degrees depending on the voltage.

When the voltage Vβ is applied to the liquid crystal, as shown in FIG. 2, while passing through the first liquid crystal 100, linearly polarized light L1 is converted into polarization with β angle to become L1^, and while passing through the first liquid crystal 100, linearly polarized light L2 perpendicular to the linearly polarized light L1 is converted into polarization in the horizontal direction to become L2^.

When a voltage is not applied, incident light is converted into polarization of 90 degrees with a high-purity, whereas when medium voltage is applied, polarization conversion occurs in the incident light with a low-purity.

The polarized light converted in the vertical direction is mainly L1, but some L2 are also included. This contribution is called relative contribution and is expressed as L1^=a*L1+b*L2.

Here, L1, L2, L1^, and L2^ are light intensity of each polarization component, and a, b are relative contributions.

Likewise, polarization converted into a horizontal direction is expressed as L2^=a*L2+b*L1.

When the light emitted from the liquid crystal passes through the first polarizing filter 200, the polarized light component L2^=a*L2+b*L1 is blocked and only the polarized light component L1^=a*L1+b*L2 is emitted, whereby the emitted light is imaged by the image sensor 600.

In this way, the penetrated polarization changes according to the applied voltage of the liquid crystal, so that polarization conversion occurs.

High-purity polarization conversion occurs when the allowed maximum voltage is applied to the liquid crystal and when 0V is applied. Whereas low-purity polarization conversion occurs when the medium voltage is applied.

As a result, it is possible to select the penetrated polarization direction of incident light with the applied voltage.

In addition to TN liquid crystals, liquid crystals such as STN, VA, and IPS are also capable of performing these operation in a similar manner.

FIG. 3 is a graph showing a relationship between a liquid crystal voltage Vβ and a polarization conversion angle β of a TN liquid crystal.

When liquid crystal voltage is 0V, almost all of the incident horizontally polarized light L1 is converted into vertically polarized light L1^ and emitted from the liquid crystal. Whereas when the liquid crystal voltage is greater than a predetermined level, the high-purity conversion occurs, wherein almost all of the incident vertically polarized light L1 is emitted as the vertically polarized light L1^.

In FIG. 3, the low-purity polarization conversion occurs at medium voltages such as Vβ1 and Vβ2. In the case where the liquid crystal voltage is Vβ1, when a polarization component of α1 angle with respect to the horizontal is incident, that is, β2 angle with respect to the vertical is incident, a large portion of the incident light intensity is converted into the vertically polarized light L1^. However, this polarization conversion is not high purity close to 100% and is converted by a ratio of 'a' that is greater than 50%. The remaining portion with ratio of 'b=1−a' is converted into the polarization component perpendicular to L1^. When the liquid crystal voltage is Vβ, the emitted light is equal to L1^=a*L1+b*L2. Here, the relative ratios of polarization conversion components (i.e., relative contribution) a and b vary depending on the liquid crystal voltage W.

Accordingly, it is preferable to measure and use the relative contributions depending on the voltage applied to the liquid crystal.

When a user desires to obtain an image of polarized light incident at a predetermined polarization angle β and an image of polarized light perpendicular thereto, a voltage Vβ corresponding to the polarization angle β is applied to the first liquid crystal 100, so that the penetrated light imaged by the image sensor 600 is image-processed.

When the light intensity value at each pixel of the image sensor 600 is L1#(x,y) where (x,y) is a pixel coordinate of the image sensor, the polarization relationship such as L1#=a*L1+b*L2 is also maintained in each pixel coordinate of the image sensor. However, here, L1 and L2 of incident light are values scaled with light intensity at (x,y) so as to correspond to the pixel light intensity, and are denoted as L1(x,y) and L2(x,y).

In the equation L1#=a*L1+b*L2, a and b are values that are calculated and known in advance. To know each of the L1 and L2 components of the incident light, which are target values, L1# resulting from the value L1 at angle β and L2# resulting from the value L2 at angle β+90 degrees should be measured. To measure L2#, the first polarizing filter 200 should be placed horizontally.

In the exemplary embodiment of the present disclosure, the L2# is not measured by mechanically transferring the first polarizing filter 200 horizontally, but instead may be calculated by using an energy conservation relationship of orthogonal light intensity.

That is, by using the energy conservation relationship of the orthogonal light intensity, an equation L1 (β1)+L2 (β1+90 degrees)=L1 (β2)+L2 (β2+90 degrees) is obtained. This equation holds only for a case of a sum of the light intensity of a pair in an orthogonal relationship.

The above equation L1(β1)+L2(β1+90 degrees)=L1(β2)+L2(β2+90 degrees) is actually identical to an equation L(β1)+L(β1+90 degrees)=L(β2)+L(β2+90 degrees).

In order to make the L1 and L2 pair easier to read in the orthogonal relationship, L1 and L2, instead of L, are expressed in notation.

In this equation, if β1=0 degrees and β2=β, then L1(0 degrees)+L2(90 degrees)=L1 (β)+L2(β+90 degrees).

To obtain polarization images from four angles such as L1(0 degrees), L2(90 degrees), L1(β), and L2(β+90 degrees), the polarization images are measured at the four angles, or as in the exemplary embodiment, the polarization images are measured only at three angles and the remaining angle may be calculated through calculation.

When the polarization images are measured at the four angles, mechanical transfer such as rotating the first polarizing filter 200 is required, but when the polarization images are measured at the three angles, the polarization images of the four angles may be obtained without the mechanical transfer of the first polarizing filter 200.

For example, when L1(0 degrees) is an angle β=0 degrees, in the case of a TN liquid crystal, the liquid crystal voltage is applied close to the maximum value to measure a pixel value L1#(0) of the image sensor.

In a relationship of L1#(0 degrees)=a(0 degrees)*L1(0 degrees)+b(90 degrees)*L2(90 degrees), since the high-purity conversion is performed when the angle β=0 degrees, in a relationship where a(0)=1, and b(0)=0, an equation satisfies as follows: L1#(0)=L1(0).

When L2(90 degrees) is the angle β=90 degrees, in the case of the TN liquid crystal, a liquid crystal voltage is applied with κV to measure the pixel value L1#(90 degrees) of the image sensor.

In a relationship L1#(90 degrees)=a(90 degrees)*L1(90 degrees)+b(180 degrees)*L2(180 degrees), since the high-purity conversion is performed when the angle β=90 degrees, in a relationship where a(90 degrees)=1, and b(180 degrees)=b(0)=0, an equation satisfies as follows: L1#(90 degrees)=L1(90 degrees).

When L1(β) is the angle β degrees, in the case of the TN liquid crystal, the liquid crystal voltage is applied with Vβ to measure the pixel value L1#(β) of the image sensor.

$$L1\#(\beta)=a(\beta)*L1(\beta)+b(\beta+90 \text{ degrees})*L2(\beta+90 \text{ degrees}) \quad \text{(Equation 1)},$$

In Equation 1, the low-purity conversion is performed when the angle β is not 0 degrees or 90 degrees.

$$L1(0 \text{ degrees})+L2(90 \text{ degrees})=L1(\beta)+L2(\beta+90 \text{ degrees}) \quad \text{(Equation 2)}$$

In Equation 2, since L1(0 degrees) and L2(90 degrees) are already measured and known, when Equations 1 and are solved by combining together, L1(β) and L2(β+90 degrees) are calculated.

By calculating the above terms, all polarization images of the four angles are to be found.

That is, in Equation 2, when L2(β+90)=L1(0)+L2(90 degrees)−L1(β) is substituted into Equation 1, $$L1\#(\beta)=a*L1(\beta)+b*L2(\beta+90 \text{ degrees})=a*L1(\beta)+b*[L1(0)+L2(90 \text{ degrees})-L1(\beta)]=(a-b)*L1(\beta)+b*[L1(0)+L2(90 \text{ degrees})], \text{ and}$$

$$L1(\beta)=[L1\#(\beta-b*\{L1(0)+L2(90 \text{ degrees})\}]/(a-b) \text{ are obtained.}$$

Through the calculations as above, the target value L1(β) may be calculated. By substituting this value into Equation 2, L2(β+90 degrees) is calculated.

As shown in FIGS. 4A to 4C, the first polarizing filter 200 of the automatic polarization control device according to the exemplary embodiment of the present disclosure is provided with a plurality of regions in which a penetrated polarization direction is fixed for each region, wherein there are at least two types of penetrated polarization directions.

That is, the penetrated polarization directions different from each other may be separately provided in the plurality of regions.

For example, when a lens 500 (not shown) is provided between the first liquid crystal 100 and the first polarizing filter 200, images having different polarization states are imaged for each region of the image sensor, and the image having each polarization state may be extracted in subsequent processing.

As shown in FIGS. 5A to 5C, the automatic polarization control device according to the exemplary embodiment of the present disclosure may further include a second liquid crystal 300 and a second polarizing filter 400.

The second liquid crystal 300 is provided between the first polarizing filter 200 and the image sensor 600, and polarizes the penetrated polarization component according to the applied voltage.

The second liquid crystal 300 has the same or similar configuration as the first liquid crystal 100.

The second liquid crystal 300 is for making a required polarization component among the polarization components penetrated through the first polarizing filter 200 to be parallel to the penetrated polarization direction of the second polarizing filter 400.

Referring to FIG. 5A as an example under an assumption that the TN liquid crystal is used, in a case of obtaining an image of L1^ component, a voltage of Vβ is applied to the first liquid crystal 100, and at the same time a voltage close to the maximum voltage is applied to the second liquid crystal 300. Whereas, in a case of obtaining an image of L2^ component, a voltage of Vβ is applied to the first liquid crystal 100, and at the same time a voltage applied to the second liquid crystal 300 is blocked.

The second polarizing filter 400 is provided between the second liquid crystal 300 and the image sensor 600 so that the penetrated polarization direction is fixed, thereby penetrating incident light polarized in the penetrated polarization direction.

The second polarizing filter 400 has the same or similar configuration as the first polarizing filter 200.

At this time, depending on a situation, the lens 500 may be provided in various positions such as at the front of the second liquid crystal 300, between the second liquid crystal 300 and the second polarizing filter 400, and at the rear of the second polarizing filter 400.

As shown in FIG. 6, the automatic polarization control device according to the exemplary embodiment of the present disclosure may further include an image design part 900 for designing an image processing sequence so as to acquire an optimal polarization image according to the purpose of use for image processing and for controlling the polarization controller 150 and the processor 700 according to the designed image processing sequence.

The image design part 900 is a part for designing the optimal polarization image so as to obtain the optimal image according to the purpose of use and a situation ahead in which a camera performs image processing. The purpose of use refers to the use for automobiles, surveillance, inspection, identification of moving objects, detection of roads, objects, vehicles, or lanes, defogging in fog, road characteristics, distinguishment of slipping (i.e., water, snow, ice) on the roads, etc., wherein the image design part 900 automatically designs the optimal polarization image appropriate for the purpose of automobiles, surveillance, inspection, identification of moving objects, detection of roads, objects, vehicles, or lanes, defogging in fog, road characteristics, and distinguishment of slipping (i.e., water, snow, ice) on the roads. When the purpose of use varies depending on the situation, the image design part 900 automatically designs an image processing sequence so as to obtain polarization images differently.

The image design part 900 may be implemented so as to design and store an image processing sequence in advance according to the purpose of use, match and use the image processing sequence, and enable the designing of the image processing sequence through machine learning.

For example, every 1 second, for 0.05 seconds, an image having the largest polarization difference is determined among polarization images at four angles of 0 degrees, 90 degrees, 45 degrees, and 135 degrees, so that when the polarization difference of 45 degrees and 135 degrees is large, only the polarized light having 45 degrees and 135 degrees is stored for the next 0.95 seconds. For 0.05 seconds, which is the start of the next 1 second, the image having the largest polarization difference is determined among the polarization images at the four angles of 0 degrees, 90 degrees, 45 degrees, and 135 degrees, so that when the polarization difference of 0 degrees and 90 degrees is large, only the polarized light having 0 degrees and 90 degrees is stored for the next 0.95 seconds.

At this time, when determining the polarization difference, various embodiments are possible, wherein a weight may be given to an important region of an image for determination, and also the total polarization difference may be determined by giving a weight to the central region rather than other regions of the image.

At this time, in conjunction with a cycle in which a voltage changes, the image design part 900 may design an image processing sequence so as to automatically perform image processing for an image and store the processed image.

For example, by way of applying 0V to a liquid crystal during t1 time, applying the maximum voltage to the liquid crystal during the next t2 time, and applying 0V to the liquid crystal during the next t1 time, the liquid crystal is driven periodically with a cycle of t1+t2 time, and a camera image-processed image is stored in the image storage in conjunction with the cycle. Then, it is possible for the camera image-processed image (i.e., photo or video) stored in the image storage to be stored as the polarization image corresponding to the liquid crystal 0V and the polarization image corresponding to the maximum liquid crystal voltage alternately.

For another example, by way of applying a voltage corresponding to a polarization angle th1 to the first liquid crystal 100 during t1 time, applying a voltage corresponding to a polarization angle th2 to the liquid crystal during t1 time, applying a voltage corresponding to a polarization angle th4 to the liquid crystal during t1 time, and applying a voltage corresponding to a polarization angle th3 to the liquid crystal during t1 time, the liquid crystal is driven periodically with the four t1 times as one cycle tp, and then the image may be stored in the image storage 800 after performing image processing for the penetrated light imaged for each t1 time in conjunction with this cycle. That is, the image may be stored in the image storage after the image processing is performed once or several times during each t1 time.

Then, in the camera image-processed image (i.e., photo or video) stored in the image storage 800, those polarization images th1, th2, th4, and th3 are sequentially stored repeatedly. That is, when an image at a point of time k is I(k) where k is a time index, the polarization images may be image-processed and stored in such a way that I(k) is polarized light th1, I(k+1) is polarized light th2, I(k+2) is polarized light th4, I(k+3) is polarized light th3, and I(k+4) is polarized light th1.

As shown in FIG. 7, the automatic polarization control device according to the exemplary embodiment of the present disclosure may further include the image determination part 950 that selects a polarization image suitable for the purpose of use for image processing by comparing polarization images of various angles according to a design of the image design part 900, or generates an image suitable for the purpose of image processing based on the polarization images of various angles.

That is, according to a design such as the purpose of use made by the image design part 900, the image determination part 950 determines an image and instructs the polarization controller 150 so as to obtain an appropriate polarization image, the polarization controller 150 controls the liquid crystal to automatically adjust the penetrated polarization direction of incident light, and the processor 700 may store the image in the image storage 800 as it is or store the image in the image storage 800 by a combination process, the image being processed by the image sensor of a camera by using the image determination part 950.

The image determination part 950 serves a role of determining images in order to select or combine polarization images, corresponding to the designed result such as the purpose of use made by the image design part 900, among the polarization images of various angles such as κ degrees, 90 degrees, 45 degrees, 135 degrees, 30 degrees, and 120 degrees.

As an example, to simply explain only two polarization images having polarized light of 0 degrees and polarized light of 90 degrees, a reflected image is emphasized and image-processed in the polarization image of 0 degrees with respect to the earth's surface (see FIG. 9), the reflected image almost disappears and a clear image is image-processed in the polarization image of 90 degrees with respect to the earth's surface (see FIG. 10), and the image determination part 950 may select and use the polarization image suitable for the purpose of use.

For another example, when polarization difference of images based on polarization angles of 45 degrees and 135 degrees is larger than polarization difference of images based on the polarization angles of 0 degrees and 90 degrees, the image determination part 950 may determine and store the image having the large polarization difference.

For yet another example, by comparing polarization images of various angles, a polarization difference image of an angle showing the largest polarization difference may be generated.

The image determination part 950 of the automatic polarization control device according to the exemplary embodiment of the present disclosure may generate the image by using any one calculation selected from calculations of maximum pixel value calculation, minimum pixel value calculation, image calculation for an absolute value of a polarization difference, and polarization difference image calculation for each color, the calculations being based on a plurality of polarization images.

The maximum pixel value calculation generates an image with a combination of the maximum pixel light intensity value, max(L1(x,y), L2(x,y), L3(x,y), L4(x,y)).

For example, when L1(x,y), L2(x,y), L3(x,y), and L4(x,y) are respectively polarization image pixel light intensity values at 0 degrees, 90 degrees, 45 degrees, and 135 degrees, the images are generated by collecting only information with the largest pixel light intensity value among polarization images for each pixel (see FIG. 11).

An image having the maximum image value that uses the maximum pixel value calculation may be used for the purpose of obtaining an image that emphasizes the reflection of an object.

The minimum pixel value calculation is to generate an image by using a combination of the minimum pixel light intensity value, min(L1(x,y), L2(x,y), L3(x,y), L4(x,y)), (see FIG. 12).

The image having the minimum image value that uses the minimum pixel value calculation may be used for the purpose of obtaining a much clearer image with better color sense by minimizing the reflection of an object.

In the image calculation for the absolute value of the polarization difference, by using a pair of images in which an angle difference of 90 degrees occurs, an image is generated by combining an absolute value of the difference in pixel light intensity value between each pixel, the absolute values including: an absolute value of the difference in the pixel light intensity value of the polarization difference image between 0 degrees and 90 degrees; and an absolute value of the difference in the pixel light intensity value of the polarization difference image between 45 degrees and 135 degrees, as abs[L1(x,y)−L2(x,y)] and abs[L3(x,y)−L4(x,y)].

The image having the absolute value of the polarization difference generated by using the image calculation of the absolute value of the polarization difference may emphasize an image having the largest polarization difference. Since an image having the absolute value of the polarization difference has an effect of emphasizing an object, the image may be used for the purpose of identifying moving objects, detecting vehicles ahead, detecting lanes on a road in fog, etc.

The image calculation of a polarization difference for each color may help a user to easily identify an object by differently displaying the image calculation of the polarization difference for each color.

At this time, RGB color may be used as the color.

For example, when R1(x,y) and G1(x,y) are respectively red and green color components of L1(x,y), The region where L1(x,y)<L2(x,y) is displayed in red color by using calculation of abs[R1(x,y)−R2(x,y)], and the region where L1(x,y)>L2(x,y) may be displayed in green color by using calculation of abs[G1(x,y)−G2(x,y)], (see FIG. 14).

The image of the polarization difference for each color using the image calculation of the polarization difference for each color may be used for surveillance, a vehicle camera display, etc.

As shown in FIG. 8, in the automatic polarization control method according to the exemplary embodiment of the present disclosure, there is provided an automatic polarization control method using the automatic polarization control device including: a first liquid crystal 100 for polarizing a penetrated polarization component according to an applied voltage; a polarization controller 150 for controlling a voltage applied to the first liquid crystal 100; a first polarizing filter 200 provided at the rear of the first liquid crystal 100 so that a penetrated polarization direction is fixed and penetrating incident light polarized in the penetrated polarization direction; an image sensor 600 provided at the rear of the first polarizing filter 200, and in which the penetrated light passing through the first liquid crystal 100 and the first polarizing filter 200 is imaged; a processor 700 performing image processing for the penetrated light imaged by the image sensor 600; an image storage 800 for storing the image that is image-processed by the processor 700; an image design part 900 for designing an image processing sequence so as to obtain an optimal polarization image according to the purpose of use for image processing and for controlling the polarization controller 150 and the processor 700 according to the designed image processing sequence; and an image determination part 950 that selects a polarization image suitable for a situation ahead or the purpose of use for image processing by comparing polarization images of various angles according to a design of the image design part 900, or generates an image suitable for the situation ahead or the purpose of use for image processing based on the polarization images of various angles, the automatic polarization control method including: a step S10 of designing an optimal polarization image; a step S20 of processing an image; and a step S30 of acquiring an optimal image.

In the step S10 of designing the optimal polarization image, the image design part 900 designs to acquire an optimal polarization image according to the purpose of use.

In the step S10 of designing the optimal polarization image, the purpose of use may be input by using a liquid crystal control UI (user interface). As for the purpose of use, it is possible to input whether the purpose is for automobiles, surveillance, inspection, identification of moving objects, detection of roads, objects, vehicles, or lanes, defogging in fog, etc., and the image design part 900 designs the optimal image according to the purpose of use.

In the step S10 of designing the optimal polarization image, an image processing algorithm is established to acquire the optimal polarization image by determining an image for selecting or combining polarization images suitable for the purpose of use among the polarization images of various angles such as 0 degrees, 90 degrees, 45 degrees, 135 degrees, 30 degrees, and 120 degrees. At this time, it is also possible to perform a calculation between polarization images to establish the algorithm.

In the step S20 of processing an image, the processor 700 controls the polarization controller 150 according to a design of the step S10 of designing the optimal polarization image to perform image processing for a required image.

That is, in the step S20 of processing an image, the image is image-processed according to the image processing sequence designed by the image design part 900.

In the step S30 of acquiring an optimal image, the image determination part 950 compares polarization images of various angles according to the design of the image design part 900 and selects a polarization image suitable for the situation ahead or the purpose of use to perform image processing, or generates an image suitable for the purpose of use based on polarization images of various angles.

In the step S30 of acquiring an optimal image, an image suitable for the purpose of use among the image-processed (i.e., stored) images is selected, or the images are calculated and stored based on the image-processed (i.e., stored) polarization image, thereby generating an image suitable for the purpose of use.

At this time, in the step S30 of acquiring an optimal image, the image suitable for the purpose of use is generated by applying relative contributions based on polarization images of various angles.

The relative contribution is also referred to as relative ratio of polarization conversion component.

Next, two methods for calculating the relative ratios of polarization conversion components (a, b) will be described.

In the relative contribution, after polarized light having a polarization conversion angle of $\beta$ angle is incident and a voltage $V\beta$ is applied to the first liquid crystal 100, a polarizing filter is put in a state of penetrating vertically polarized light and the light intensity $La\hat{}$ is measured in a light sensor, the polarizing filter is put in a state of penetrating horizontally polarized light and the light intensity $Lb\hat{}$ is measured in the light sensor, and then $a=La\hat{}/(La\hat{}+Lb\hat{})$ $b=Lb\hat{}/(La\hat{}+Lb\hat{})$ (where, a and b are relative contributions.)

By combining the above two equations, a and b are calculated.

Here, in a polarizing filter, the polarizing filter having the same capability for transmission polarization as that of the first polarizing filter 200 may be used, and when the first polarizing filter 200 is able to be moved, the first polarization filter 200 may be used.

That is, in one method, as a first step, polarized light having a polarization conversion angle of $\beta$ angle is incident, that is, the polarized light forming the $\beta$ angle with respect to the vertical and forming $\alpha$ angle with respect to the horizontal is incident. This method is realized in a way of passing the incident light through a polarizing film whose transmission direction forms the $\beta$ angle with respect to the vertical.

As a second step, a voltage $V\beta$ is applied to the liquid crystal. As an example, the first polarizing filter 200 is placed vertically and a voltage in which the light intensity of the light sensor is the maximum is selected. This voltage is $V\beta$.

As a third step, the first polarizing filter 200 is put in a state of penetrating vertically polarized light and the light intensity $La\hat{}$ is measured in a light sensor, and the first polarizing filter 200 is put in a state of penetrating horizontally polarized light and the light intensity $Lb\hat{}$ is measured in the light sensor.

As a fourth step, the relative ratios a and b of polarization conversion components are calculated from a relationship, $a=La\hat{}/(La\hat{}+Lb\hat{})$ and $b=Lb\hat{}/(La\hat{}+Lb\hat{})$. The relative ratios a and b of the polarization conversion components are a function of the liquid crystal voltage $V\beta$ or the polarization conversion angle $\beta$.

As a fifth step, while changing the liquid crystal voltage $V\beta$ and the polarization conversion angle $\beta$, the first step to the fourth step are repeated to calculate and store the relative ratios a and b of the polarization conversion components.

In the relative contributions, after horizontally polarized light is incident and a voltage $V\beta$ is applied to the first liquid crystal 100, the polarization filter is rotated at an angle where light intensity of a light sensor is the maximum so that the angle from the horizontal to an angle at which the light intensity is the maximum is measured and stored as $\beta$ angle, and the light intensity of the light sensor at the angle where the light intensity is the maximum is measured and stored as $La\hat{}$. Then, the polarizing filter is rotated in a state perpendicular to the angle where the light intensity is the maximum so that the light intensity of the light sensor is measured and stored as $Lb\hat{}$. Afterward, the polarization filter is put in a state where horizontally polarized light is penetrated, and the light intensity $Lb\hat{}$ is measured in the light sensor, and then $a=La\hat{}/(La\hat{}+Lb\hat{})$ $b=Lb\hat{}/(La\hat{}+Lb\hat{})$ (where, a and b are relative contributions.)

By combining the above two equations, a and b are calculated.

That is, in another method, as a first step, horizontally polarized light L1=LH is incident.

As a second step, a voltage $V\beta$ is applied to a liquid crystal.

As a third step, the first polarizing filter 200 is rotated at an angle where light intensity of a light sensor is maximum. The angle from the horizontal to an angle at which the light intensity is the maximum is measured and stored as $\beta$ angle.

As a fourth step, the light intensity of the light sensor at the angle of the third step is measured and set to $La\hat{}$, and the first polarizing filter 200 is rotated in a state perpendicular to the angle of the third step, so that the light intensity of the light sensor is measured and set to Lb^. When the first polarizing filter 200 is rotated, Lb^ is the minimum light intensity value and La^ is the maximum light intensity value.

As a fifth step, the relative ratios of the polarization conversion components a and b are calculated from a relationship, a=La^/(La^+Lb^) and b=Lb^/(La^+Lb^). The relative ratios a and b of the polarization conversion components are a function of the liquid crystal voltage Vβ or the polarization conversion angle β.

As a sixth step, while changing the liquid crystal voltage V and the polarization conversion angle β, the first step to the fifth step are repeated to calculate and store the relative ratios a and b of the polarization conversion components.

As shown in FIG. 8, the automatic polarization control device used in the automatic polarization control method according to the exemplary embodiment of the present disclosure includes: a second liquid crystal 300 provided between the first polarizing filter 200 and the image sensor 600 and polarizing a penetrated polarization component according to an applied voltage; and a second polarizing filter 400 provided between the second liquid crystal 300 and the image sensor 600 so that the penetrated polarization direction is fixed and penetrating incident light polarized in the penetrated polarization direction, wherein the first polarizing filter 200 is provided with a plurality of regions in which the penetrated polarization direction is fixed for each region.

The a step (S20) of processing an image of the automatic polarization control method includes a step (S21) of applying a voltage, wherein a voltage Vβ corresponding to the polarization angle of β angle is applied to the first liquid crystal 100; and a step S22 of processing sequential image, wherein the penetrated light imaged by the image sensor 600 is sequentially image-processed while sequentially changing and applying a voltage to the second liquid crystal 300, so that only one penetrated light sequentially passes through the second polarization filter 400 among penetrated light penetrated through the second liquid crystal 300 in a transmission polarization direction for each region of the first polarizing filter 200.

The step S30 of acquiring an optimal image of the automatic polarization control method is based on the image acquired in the step S22 of processing sequential image.

$$L1\#=a(\beta)*L1(\beta)+b(\beta+90\ \text{degrees})*L2(\beta+90\ \text{degrees})$$

$$L2\#=a(\beta+90\ \text{degrees})*L2(\beta+90\ \text{degrees})+b(\beta)*L1(\beta)$$

(Where L1# is a pixel light intensity value of penetrated light L1^ in the image sensor 600, L2# is a pixel light intensity value of penetrated light L2^ in the image sensor 600, L1, L2, L1^, and L2^ are the light intensity of each polarization component, and a, b are relative contributions.)

By combining the above two equations, L1(β) and L2(β+90 degrees) are calculated, and are used to generate an image suitable for the purpose of use.

That is, as another method of obtaining a polarization image of a predetermined polarization angle, by using the first polarizing filter 200 having a plurality of penetrated polarization directions different from each other for each region, a plurality of polarized light waves is penetrated for each region and additionally passes through the second liquid crystal 300 and the second polarizing filter 400, so that the penetrated light imaged by the image sensor 600 is image-processed.

Referring to FIG. 5A in more detail as an example, when a user desires to obtain an image of polarized light incident at a predetermined polarization angle β and an image of polarized light perpendicular thereto, the voltage Vβ corresponding to the polarization angle β is applied to the first liquid crystal 100.

As shown in FIG. 5A, when a half of the first polarizing filter 200 is made of a vertical polarization film and the other half thereof is made of a horizontal polarization film, a half of emitted light passing through the first polarizing filter 200 is L1^ and the other half thereof is L2^.

Next, a voltage close to a maximum value equal to or greater than a predetermined value is applied to the second liquid crystal 300, so that L2^ is blocked and only L1^ is allowed to pass, thereby being imaged by the image sensor 600.

Then, the pixel intensity value L1# of the image sensor 600 at this time is obtained as L1#=a(β)*L1(β)+b(β+90 degrees)*L2(β+90 degrees).

Next, a voltage of 0V is applied to the second liquid crystal 300, so that L1^ is blocked and only L2^ is allowed to pass, thereby being imaged by the image sensor 600.

Then, the pixel intensity value L2# of the image sensor 600 at this time is obtained as L2#=a(β+90 degrees)*L2(β+90 degrees)+b(β)*L1(β).

Next, by combining calculating L1# and L2# measured above, L1(β) and L2(β+90 degrees) are obtained.

Thus, to obtain polarization images at four angles, such as L1(0 degrees), L2(90 degrees), L1(β), and L2(β+90 degrees), the polarization images may be calculated by measuring and combining the polarization images at four angles. This method measures the polarization images at four angles, but does not require mechanical transfer such as rotating the polarizing film.

FIGS. 5B and 5C show the exemplary embodiment in which the first polarizing filter 200 is divided into four, and then the penetrated polarization directions are configured to form at 0 degrees, 90 degrees, 45 degrees, and 135 degrees, respectively.

In the above, an example in which the penetrated polarization directions different from each other are formed in each region is shown, but the present disclosure is not limited thereto. Apparently, various embodiments are possible such that after dividing the first polarizing filter 200 into four equal regions, two regions are configured to form a penetrated polarization direction of 0 degrees, and the other two regions are configured to form a penetrated polarization direction of 90 degrees (i.e., a half of the first polarizing filter is made of a vertically polarized film and the other half thereof is made of a horizontally polarized film).

At this time, a and b are calculated as follows: after polarized light having a polarization conversion angle of β angle is incident and a voltage Vβ is applied to the first liquid crystal 100, a voltage that transmits vertically polarized light to the second liquid crystal 300 is applied to measure the light intensity La^ in the image sensor 600, and a voltage that transmits horizontally polarized light to the second liquid crystal 300 is applied to measure the light intensity Lb^ in the image sensor 600, and then $$a=La^{\wedge}/(La^{\wedge}+Lb^{\wedge})$$

$$b=Lb^{\wedge}/(La^{\wedge}+Lb^{\wedge})$$

By combining the above two equations, a and b are calculated.

In the step S30 of acquiring an optimal image of the automatic polarization control method according to the exemplary embodiment of the present disclosure, the image suitable for the purpose of use is generated by using any one calculation selected from calculations of maximum pixel value calculation, minimum pixel value calculation, image calculation for an absolute value of a polarization difference, and polarization difference image calculation for each color, the calculations being based on a plurality of polarization images, wherein the difference calculation of image calculation of the absolute value of difference (i.e., image calculation for the absolute value of the polarization difference, the polarization difference image calculation for each color) includes division calculation and log difference calculation.

The maximum pixel value calculation generates an image by a combination of the maximum pixel light intensity value, max(L1(x,y), L2(x,y), L3(x,y), L4(x,y)).

For example, when L1(x,y), L2(x,y), L3(x,y), and L4(x,y) are respectively the polarization image pixel light intensity values at 0 degrees, 90 degrees, 45 degrees, and 135 degrees, the image is generated by collecting only the information having the largest pixel light intensity value among the polarization images for each pixel (see FIG. 11).

The image having the maximum image value using the maximum pixel value calculation may be used for the purpose of obtaining an image emphasizing reflection of an object.

In the minimum pixel value calculation, the image is generated by a combination of the minimum pixel light intensity value, min(L1(x,y), L2(x,y), L3(x,y), L4(x,y)), (see FIG. 12).

The image having the minimum image value using the minimum pixel value calculation may be used for the purpose of obtaining a much clearer image with better color sense by minimizing the reflection of the object.

In the image calculation for the absolute value of the polarization difference, by using a pair of images in which an angle difference of 90 degrees occurs, an image is generated by combining an absolute value of the difference in pixel light intensity value between each pixel, the absolute values including: an absolute value of the difference in the pixel light intensity value of the polarization difference image between 0 degrees and 90 degrees; and an absolute value of the difference in the pixel light intensity value of the polarization difference image between 45 degrees and 135 degrees, as abs[L1(x,y)−L2(x,y)] and abs[L3(x,y)−L4(x,y)].

The image of the absolute value of the polarization difference generated by using the image calculation of the absolute value of the polarization difference may emphasize an image having the largest polarization difference. Since an image having an absolute value of a polarization difference has an effect of emphasizing an object, the image may be used for the purpose of identifying moving objects, detecting vehicles ahead, detecting lanes on a road in fog, etc.

The image calculation of the polarization difference for each color may help a user to easily identify an object by differently displaying the image calculation of the polarization difference for each color.

At this time, RGB color may be used as the color.

For example, when R1(x,y) and G1(x,y) are the red and green color components of L1(x,y), The region where L1(x,y)<L2(x,y) is displayed in red color by using calculation of abs[R1(x,y)−R2(x,y)], and the region of L1(x,y)>L2(x,y) may be displayed in green color by using calculation of abs[G1(x,y)−G2(x,y)], (see FIG. 14).

The image of the polarization difference for each color using the image calculation of the polarization difference for each color may be used for surveillance, a vehicle camera display, etc.

In the above, minus (−) calculation is mainly described as the difference calculation of the image calculation of the absolute value of the difference (i.e., the image calculation of the absolute value of the polarization difference, the polarization difference image calculation for each color), but division calculation and log difference calculation are also the same concept as that of the difference calculation, whereby, the description therefor is omitted.

The present disclosure is not limited to the above-described exemplary embodiments, and apparently, the scope of application is diverse. In addition, various modifications can be made without departing from the spirit of the present disclosure as claimed in the claims.

The invention claimed is:

1. An automatic polarization control device, the device comprising:
   a first liquid crystal for polarizing a penetrated polarization component according to an applied voltage by rotating at a predetermined angle;
   a polarization controller for controlling a voltage applied to the first liquid crystal a first polarizing filter provided at a rear of the first liquid crystal so as to fix a penetrated polarization direction and penetrating incident light polarized in the penetrated polarization direction;
   an image sensor provided at a rear of the first polarizing filter and imaging the penetrated light passing through the first liquid crystal and the first polarizing filter;
   a processor performing image processing for the penetrated light imaged by the image sensor;
   an image storage for storing an image that is image-processed by the processor;
   an image design part for designing an image processing sequence so as to acquire an optimal polarization image according to a purpose of use for the image processing and controlling the polarization controller and the processor according to the designed image processing sequence; and
   an image determination part for comparing polarization images of various angles according to a design of the image design part to select the polarization images suitable for the purpose of use for the image processing, or generating an image suitable for the purpose of the image processing based on the polarization images of various angles,
   wherein the image determination part generates an image suitable for the purpose of use by applying relative contributions based on polarized images of various angles,
   wherein the relative contributions are calculated by making polarized light having a polarization conversion angle of $\beta$ angle incident, applying a voltage V to the first liquid crystal, putting the polarizing filter in a state of penetrating vertically polarized light, measuring light intensity La^ with a light sensor, putting the polarizing filter in a state of penetrating horizontally polarized light, measuring light intensity Lb^ with the light sensor, or
   the relative contributions are calculated by making horizontally polarized light incident, applying a voltage V$\beta$ to the first liquid crystal, rotating the polarizing filter at the angle where light intensity of a light sensor is the maximum, measuring an angle from the horizontal to an angle at which the light intensity is the maximum to store as a $\beta$ angle, measuring the light intensity of the light sensor at the angle where the light intensity is the maximum to store as La^, rotating the polarizing filter in a state perpendicular to the angle where the light intensity is the maximum to measure the light intensity of the light sensor and store as Lb^, putting the polarizing filter in a state in which the horizontally polarized light is penetrated, measuring light intensity Lb^ in the light sensor, wherein, when incident light is incident to the first liquid crystal, a polarization component rotates β degrees and is emitted from the first liquid crystal according to the voltage applied to the first liquid crystal, and as emitted light passes through the first polarizing filter, only a component corresponding to the penetrated polarization direction of the first polarizing filter is emitted, so that the emitted light is imaged by the image sensor.

2. The device of claim 1, wherein the first polarizing filter comprises a plurality of regions where the penetrated polarization direction is fixed for each region, and there are at least two types of the penetrated polarization direction.

3. The device of claim 2, further comprising:

a second liquid crystal provided between the first polarizing filter and the image sensor and polarizing the penetrated polarization component according to the applied voltage; and a second polarizing filter provided between the second liquid crystal and the image sensor so as to fix the penetrated polarization direction and penetrating the incident light polarized in the penetrated polarization direction.

4. The device of claim 1, wherein the automatic polarization control device comprises:

a second liquid crystal provided between the first polarizing filter and the image sensor and polarizing the penetrated polarization component according to the applied voltage; and a second polarizing filter provided between the second liquid crystal and the image sensor so that the penetrated polarization direction is fixed and the incident light polarized in the penetrated polarization direction is penetrated, and wherein the first polarizing filter is provided with a plurality of regions where the penetrated polarization direction is fixed for each region.

5. The device of claim 1, wherein the image determination part generates an image by using any one calculation selected from among maximum pixel value calculation, minimum pixel value calculation, image calculation of an absolute value of a polarization difference, and polarization difference image calculation for each color, the calculation being based on a plurality of polarization images.

6. An automatic polarization control method using an automatic polarization control device, the device comprising: a first liquid crystal for polarizing a penetrated polarization component according to an applied voltage by rotating at a predetermined angle; a polarization controller for controlling a voltage applied to the first liquid crystal; a first polarizing filter provided at a rear of the first liquid crystal so as to fix a penetrated polarization direction is fixed and penetrating incident light polarized in the penetrated polarization direction; an image sensor provided at a rear of the first polarizing filter and imaging the penetrated light passing through the first liquid crystal and the first polarizing filter; a processor performing image processing for the penetrated light imaged by the image sensor; an image storage for storing an image that is image-processed by the processor; an image design part for designing an image processing sequence so as to acquire an optimal polarization image according to a purpose of use for the image processing and controlling the polarization controller and the processor according to the designed image processing sequence; and an image determination part for comparing polarization images of various angles according to a design of the image design part to select the polarization images suitable for a situation ahead or the purpose of use for the image processing, or generating an image suitable for the situation ahead or the purpose of the image processing based on the polarization images of various angles, the method comprising:

designing an optimal polarization image for acquiring the optimal polarization image according to the purpose of use by the image design part;

processing an image in which the processor controls the polarization controller according to a design of the designing of the optimal polarization image to perform the image processing for a required image; and acquiring an optimal image for comparing the polarization images of various angles according to the design of the image design part to select the polarization images suitable for the situation ahead or the purpose of use for the image processing, or generating an image suitable for the purpose of use by applying relative contributions based on the polarization images of various angles, wherein the relative contributions are calculated by making polarized light having a polarization conversion angle of β angle incident, applying a voltage V to the first liquid crystal, putting the polarizing filter in a state of penetrating vertically polarized light, measuring light intensity La^ with a light sensor, putting the polarizing filter in a state of penetrating horizontally polarized light, measuring light intensity Lb^ with the light sensor, or the relative contributions are calculated by making horizontally polarized light incident, applying a voltage Vβ to the first liquid crystal, rotating the polarizing filter at the angle where light intensity of a light sensor is the maximum, measuring an angle from the horizontal to an angle at which the light intensity is the maximum to store as a β angle, measuring the light intensity of the light sensor at the angle where the light intensity is the maximum to store as La^, rotating the polarizing filter in a state perpendicular to the angle where the light intensity is the maximum to measure the light intensity of the light sensor and store as Lb^, putting the polarizing filter in a state in which the horizontally polarized light is penetrated, measuring light intensity Lb^ in the light sensor.

7. The method of claim 6, wherein the relative contributions are calculated by combining equations $a=La^{\wedge}/(La^{\wedge}+Lb^{\wedge})$ and $b=Lb^{\wedge}/(La^{\wedge}+Lb^{\wedge})$, where, a and b are the relative contributions.

8. The method of claim 6, wherein the acquiring of the optimal image (S30) calculates L1(β) and L2(β+90 degrees) by combining $L1\#=a(\beta)*L1(\beta)+b(\beta+90 \text{ degrees})*L2(\beta+90 \text{ degrees})$ and $L2\#=a(\beta+90 \text{ degrees})*L2(\beta+90 \text{ degrees})+b(\beta)*L1(\beta)$, where L1# is a pixel light intensity value of the penetrated light L1^ in the image sensor (600), L2# is a pixel light intensity value of the penetrated light L2^ in the image sensor (600), L1, L2, L1^, and L2^ are light intensity of each polarization component, and a, b are the relative contributions, and generates an image suitable for the purpose of use by using this calculation.

9. The method of claim 6, wherein the acquiring of the optimal image (S30) calculates L1(β) and L2(β+90 degrees) by combining $L1\#(\beta)=a(\beta)*L1(\beta)+b(\beta+90 \text{ degrees})*L2(\beta+$ 90 degrees) and L1(0 degrees)+L2(90 degrees)=L1($\beta$)+L2($\beta$+90 degrees), where L1# is a pixel light intensity value of the penetrated light L1^ in the image sensor, L1 and L2 are light intensity of each polarization B component, and a, b are the relative contributions, and generates an image suitable for the purpose of use by using this calculation.

10. The method of claim 6, wherein the acquiring of the optimal image generates the image suitable for the purpose of use by using any one calculation selected from among maximum pixel value calculation, minimum pixel value calculation, image calculation for an absolute value of a polarization difference, and polarization difference image calculation for each color, the calculation being based on a plurality of polarization images, wherein difference calculation of the image calculation of an absolute value of a difference including the image calculation for the absolute value of the polarization difference, and the polarization difference image calculation for each color comprises division calculation and log difference calculation.

* * * * *